Figure 1:
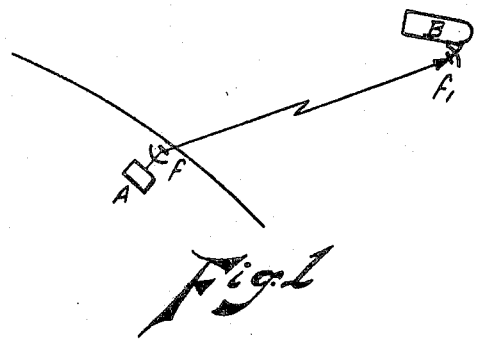

May 2, 1967    R. M. WAETJEN    3,317,909
COMPENSATION FOR DOPPLER SHIFT IN AEROSPACE COMMUNICATIONS
Filed April 7, 1964    3 Sheets-Sheet 1

INVENTOR.
RICHARD M. WAETJEN

United States Patent Office 3,317,909
Patented May 2, 1967

3,317,909
COMPENSATION FOR DOPPLER SHIFT IN AEROSPACE COMMUNICATIONS
Richard M. Waetjen, Lima, Peru, assignor to the United States of America as represented by the Secretary of the Air Force
Filed Apr. 7, 1964, Ser. No. 360,473
1 Claim. (Cl. 343—100)

The invention described herein may be manufactured and used by or for the United States Government for governmental purposes without payment to me of any royalty thereon.

This invention relates to aerospace communication, and particularly to the establishment of higher standards of stability in the performance of signal generating oscillators serving as "clocks" for the control of the signal frequency in satellite guidance, tracking, navigation, or analogous spatial operations.

There appears to be a growing need for airborne and space-borne versions of very stable oscillators for various applications like guidance, tracking, navigation, and others. The stability of such oscillators is limited because of the weight and size requirements and the generally hostile environment on board of aircraft and space vehicles caused by vibration, acceleration, also pressure, temperature, and gravitational field variations, etc. The best oscillators presently available for airborne and space applications have long-term stabilities between one part in $10^8$ and several parts in $10^{10}$, largely dependent on what size and weight can be allocated for these units, and on the particular environment. Laboratory frequency standards, on the other hand, have demonstrated long-term frequency stabilities of the order of one part in $10^{11}$ and better. These are atomic or molecular resonance oscillators, often referred to as clocks, in a highly controlled environment. Such clocks have been transported by airplane while operating, but here the transport of the operating standard from one point to another was the object of the flight rather than to derive a standard time or frequency for navigation or guidance purposes during the flight.

It can be stated in general terms that ultrastable oscillators are being used on the ground, whereas for airborne and spacecraft use one has to resort to small, lightweight, ruggedized but less stable units. If a particular mission requires a very stable frequency source on board a spacecraft—stable, let us assume, over long periods of time to one part in $10^{11}$—then one has to utilize other means.

If the distance between a ground station and the space vehicle is fixed (for example, a satellite in an ideal circular equatorial 24-hour orbit), one could simply transmit a frequency that is derived from the standard to the vehicle where it would arrive at precisely the same frequency, if a stable propagation medium is assumed. If the vehicle is in motion with respect to the ground station, then the frequency arriving at the vehicle is not equal to the transmitted frequency because of Doppler shift.

The invention herein disclosed provides a method and apparatus for improving the accuracy of signal transmission between a ground-based oscillator and a signal receiver located on a satellite or other vehicle moving through space.

Figure 2:
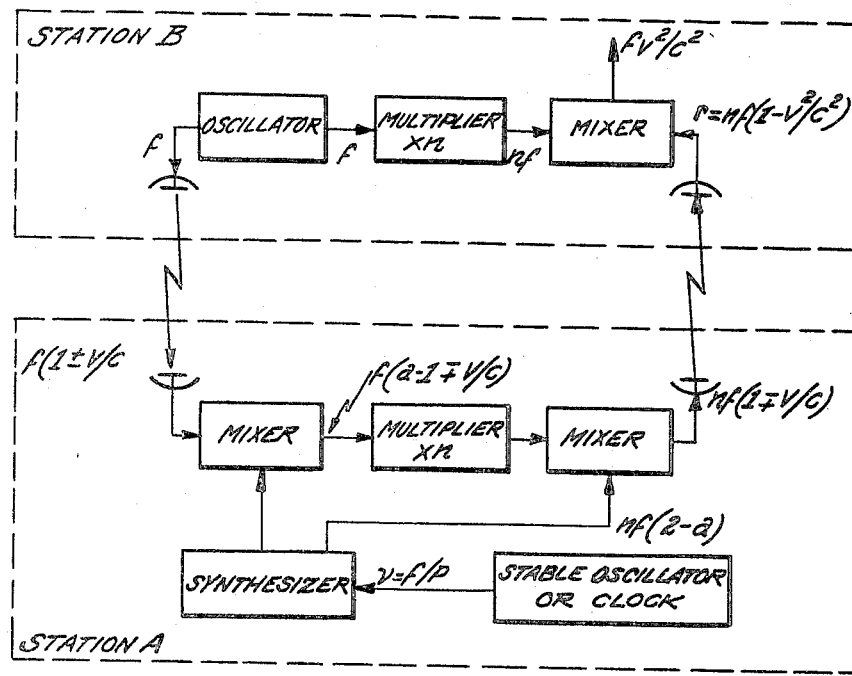
Figure 3:
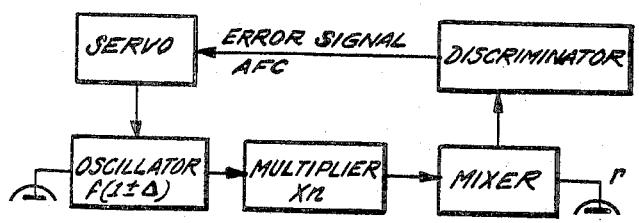
Figure 4:
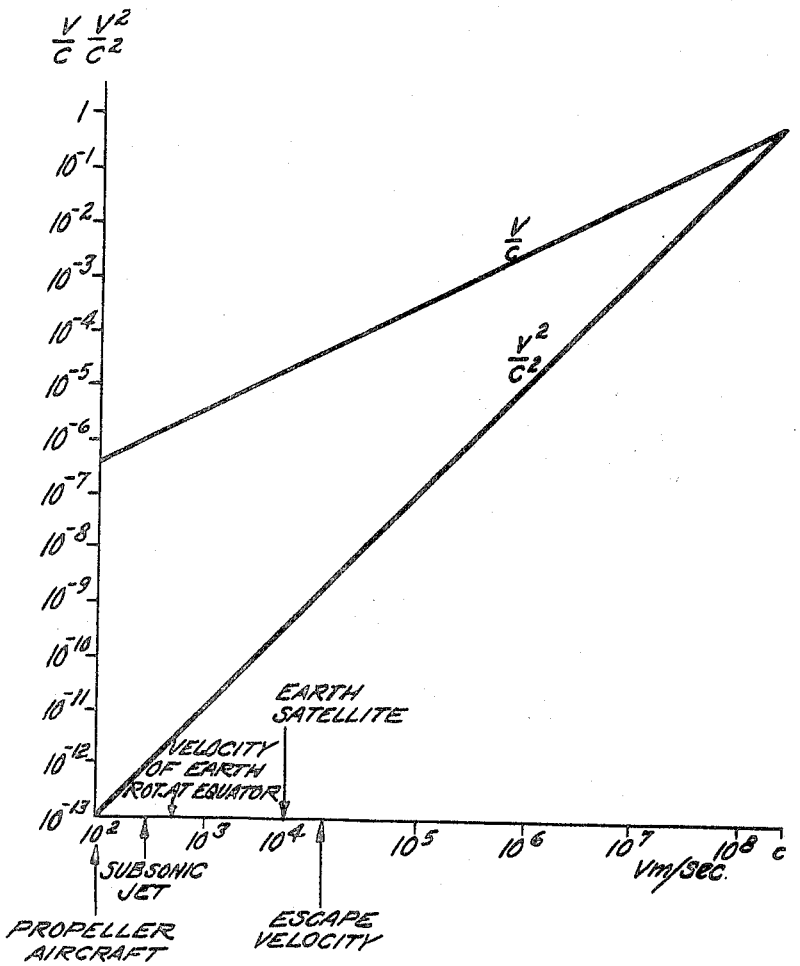

In the drawings:
FIG. 1 is an explanatory diagram.
FIG. 2 is a block diagram showing the elements and electrical interconnection involved in an embodiment of the invention.
FIG. 3 is an additional block diagram supplementing the FIG. 1 illustration.
FIG. 4 is an explanatory graph.

Figure 5:
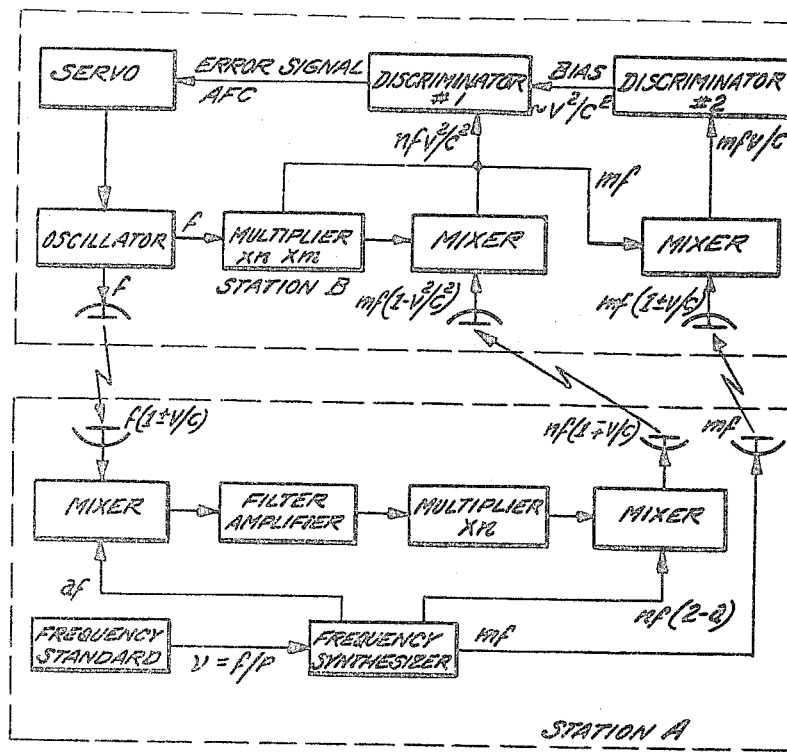
Figure 6:
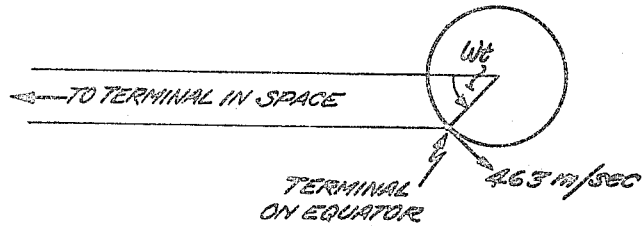

FIG. 5 is a block diagram representative of the second embodiment of the invention.
FIG. 6 is a further diagrammatic explanation pertinent to the subject matter.

Consider two stations, A and B, as depicted in FIG. 1. Station A is located on the ground; B is a space vehicle moving at a velocity $v$ relative to A. A stable oscillator is operating at A, generating a frequency $f$. This frequency is transmitted from A. Station B receives $f_1 = f(1 \pm v/c)$ because of the Doppler effect. Factor $c$ is the velocity of light. The sign of the $v/c$ term depends on the direction of motion of B relative to A. It is positive if B moves towards A, and vice versa.

Actually this $(1 \pm v/c)$ factor is an approximation used in place of the correct expression $\pm\sqrt{(v+c)/(c-v)}$. The approximation is very good at velocities much lower than the velocity of light, causing only a second-order error of the form $v^2/c^2$ and higher-order terms which will be insignificant in many practical cases.

If the velocity of the vehicle relative to station A is known, $f_1$ can be corrected at B by adding or subtracting a frequency equal to $fv/c$ in order to produce $f$. This $fv/c$ term will have to be generated with great accuracy if Doppler shift is to be eliminated effectively, especially in the case of high velocity. An earth satellite, for instance, with a velocity of 6000 m./sec. could experience a Doppler shift of one part in $10^5$. If the frequency must be corrected to within one part in $10^{11}$, then $fv/c$ must be generated to within one part in $10^6$. This seems difficult if not impossible under vehicle-borne conditions. It is therefore advisable to cancel first-order Doppler shift with a circuit as shown in FIGURE 2. All amplifiers and filters have been omitted. This circuit operates as follows:

Frequency $f$ is generated in the oscillator at the vehicle (station B) and transmitted. Due to Doppler, $f(1 \pm v/c)$ is received at A and subtracted from $af$ in the first mixer, where $1 < a < 2$. The output of the mixer is amplified and multiplied by $n$ in a multiplier-divider network; $n$ is typically a number close to but not equal to one, like $9/10$, $11/10$, $9/8$ etc. The frequency $nf(2-a)$ is added in the second mixer to produce $$nf(1 \mp v/c)$$

which is retransmitted. The two frequencies $af$ and $nf(2-a)$ are generated from a frequency $v = f/p$, a submultiple of $f$, in a synthesizer which under certain conditions can be a relatively simple frequency multiplier, as is shown in a practical example now being used.

A very stable oscillator generates $v$ which is to be transferred to the vehicle. $nf(1 \mp v/c)$ undergoes a Doppler shift while propagating to the vehicle to yield $$nf(1 - v^2/c^2)$$

at the antenna terminal. Thus the frequency received at the vehicle differs from the frequency transmitted from the vehicle only by a second-order Doppler term, equal to $fv^2/c^2$, aside from the fact that the frequency $f$ generated at the vehicle has to be multiplied by the factor $n$ before it can be compared to the received frequency. It can also be noted that the $v^2/c^2$ term has a negative sign, regardless of the sign of the $v/c$ term.

At low velocities the $v^2/c^2$ term can be neglected, and the difference frequency present at the output of the mixer at station B can be used to generate an error signal in a frequency-voltage transducer (discriminator). This error signal in turn adjusts the frequency of the oscillator until the frequencies that are generated and received at B are equal, and the error signal vanishes. FIGURE 3 depicts the necessary circuitry at station B. The maximum velocity of station B relative to station A at which this circuit can be employed effectively depends on the degree of accuracy and stability of $f$ required at B. FIGURE 4 graphically represents the first-order and second-order Doppler terms versus the vehicle velocity. It is apparent that the velocity may not be higher than approximately 300 m./sec. if the frequency accuracy is to be within or better than one part in $10^{12}$, if the circuit described above is used. A maximum velocity of 1000 m./sec. can be tolerated for one part in $10^{11}$ accuracy. For higher velocities and maximum accuracy of the frequency transfer, it becomes necessary to eliminate the second-order Doppler frequency shift. Interplanetary missions, for instance, may encounter velocities of the order of 50,000 m./second. One has to bear in mind that the velocities considered here are always relative to a point on the earth. The earth itself is traveling at a mean velocity of almost 30,000 m./sec. in its orbit around the sun, and relative vehicle velocities greater than this can occur under certain conditions. From FIG. 4 one will note that for $v=50,000$ m./sec. the second-order Doppler term has a magnitude of $3\times10^{-8}$. If a frequency is to be transmitted to the vehicle with an accuracy of one part in $10^{11}$, which corresponds to the long-term stability of a good laboratory frequency standard, the second-order Doppler shift must be eliminated to within three parts in $10^4$.

If the velocity is known within the vehicle at all times, one can generate a bias voltage proportional to $v^2/c^2$ and add this with the proper amplitude and polarity to the output of the discriminator in FIGURE 3. The velocity can also be measured and the proper bias be generated automatically with the circuit as shown in FIGURE 5. FIGURE 5 is essentially identical to the circuit in FIG. 2 including the modification of FIG. 3, with a further modification. A frequency equal to $mf$ is transmitted from station A. It arrives at B as $f''$ equals $mf(1\pm v/c)$. A mixer with a local oscillator frequency equal to $mf$ as generated at station B produces a difference frequency $$mf-mf(1\pm v/c)=mfv/c \quad (1)$$

This frequency is detected in a discriminator with a square characteristic, the output of which is proportional to the square of the frequency. This output is used to provide the first discriminator at B with a bias proportional to $v^2/c^2$. The degree of accuracy with which these operations have to be performed depends upon the relative vehicle velocity $v$ and the accuracy requirement placed on the frequency transfer from A to B.

A potentially very large source of relative velocity variation is the earth itself. A point on the equator moves at a velocity of 463 m./sec. because of rotation of the earth. The velocity $v$ of a vehicle, which is traveling at a velocity $v'$ relative to the center of the earth in the earth's equatorial plane, is therefore varying according to Equation 2, provided that the distance is much larger than the earth radius (FIG. 6).

$$v=v'+463 \sin \frac{2\pi}{86400}t \text{ m./sec., } t \text{ in sec.} \quad (2)$$

$$\omega=\frac{2\pi}{86400}$$

The velocity variation is largest when the derivative of $\sin \omega t$, which is $\cos \omega t$, is at a maximum. This occurs when $\omega t$ equals zero. The error $\Delta$ as caused by the rotation of the earth can be evaluated as follows:

$$\Delta=\frac{2.463 \sin \omega t}{c}-\frac{v'^2-463^2 \sin^2 \omega t}{c^2} \quad (3)$$

Equation 3 reveals the fact that, to a first-order approximation, $\Delta$ is not dependent upon the relative velocity of the vehicle, but rather on the angle $\omega t$ which is proportional to the propagation time and the distance between the ground and space stations.

Under certain conditions, $\Delta$ can assume fairly large values. Let us assume a practical case. A vehicle is located at a range of $4.5(10)^{10}$ m., which is about equal to the distance Earth–Venus during the first Millstone Hill radar contact in 1959. The round-trip duration for a radio signal is 5 minutes at this range, during which time the earth rotates 1.25°. The largest velocity variation according to Equation 2 occurs at or near 0°, or in this case between $-0.625°$ and $+0.625°$. For the duration of propagation to the earth an average value for $\omega t$ of 0.3125° is assumed. The value for the first term in equation 3 turns out to be $1.68(10)^{-8}$ and, considering a relative velocity $v$ of 50,000 m./sec., $\Delta$ is equal to $1.1(10)^{-8}$. This assumed case is highly unfavorable because a vehicle at very great range and traveling at extremely high velocity in the equatorial plane of the earth was considered, while a vehicle in the vicinity of the planet Venus must not necessarily be in the earth's equatorial plane because of the inclination of the axis of the earth with respect to its orbital plane. If the vehicle is located at a point on the axis of the earth (above the North or South Pole), the effect of the velocity variation due to the rotation of the earth would vanish. The same can be effected by locating the ground station at the North or South Pole. This is of course rather impractical, but one can minimize the effect by placing the ground station at a high latitude.

*Conclusion*

In the preceding columns, a circuit is described which is suitable for transmitting a signal to a moving vehicle. The frequency of the signal is largely unaffected by relative uniform or accelerated motion of the vehicle with respect to the ground station. The frequency can be transmitted with an accuracy exceeding one parts in $10^{12}$ at velocities and distances consistent with earth satellites and interplanetary probes. First-order Doppler frequency shift of the form $fv/c$ is automatically cancelled, while second-order Doppler of the form $fv^2/c^2$ is reduced by several orders of magnitude.

The circuit performs the cancellation of Doppler shift automatically. For the Doppler cancelling feature, the signal must make a complete round trip from station A, the ground station, to station B at the vehicle, and back to station A. To eliminate the $fv^2/c^2$ term, it is necessary that the velocity is known at the vehicle.

If the relative vehicle velocity during propagation from station A to B is different from the relative velocity during propagation from B to A, for a complete round trip of the signal, due to acceleration of either one or both of the stations, the accuracy of the frequency transmitted to station B is degraded. This effect can be reduced by several orders of magnitude by means of a modification of the described circuit, if the acceleration function is known.

With the above-mentioned features, the circuit makes frequency sources available within the moving vehicle, with the accuracy and stability of atomic or molecular standard-frequency oscillators. The standard oscillator itself can be ground-based, in the necessary controlled environment. Only simple amplifiers, oscillators, filters, mixers, etc., which can be ruggedized easily, are in the vehicle.

What is claimed is:

In a satellite communication system, in combination, signal generating means located at a ground station, a satellite, signal receiving means located within said satellite, signal transmitting means located within said satellite for transmitting any signals received from said ground station signal generating means back to said ground station, first signal modifying means located at said ground station for modifying the signal received back from said satellite comprising mixer means, multiplier-divider network means and oscillator means coacting to retransmit to said satellite signals having a frequency relatively free of Doppler effects of the first-order magnitude, and second signal modifying means located in said satellite comprising mixer means for retransmitting to said ground station signals having a frequency relatively free of Doppler effects of both the first-order and second-order magnitude.

References Cited by the Examiner

UNITED STATES PATENTS

| | | |
|---|---|---|
| 2,974,222 | 3/1961 | Lawson. |
| 3,174,150 | 3/1965 | Sferrazza et al. ____ 343—117 X |
| 3,204,241 | 8/1965 | Bjorkman _____ 343—112 |

OTHER REFERENCES

Badessa et al.: "A Doppler-Cancellation Technique for Determining the Altitude Dependence of Gravitational Red Shift in an Earth Satellite," Proceedings of the I.R.E., vol 48, No. 4, April 1960, pp. 758–764.

RODNEY D. BENNETT, *Primary Examiner.*

CHESTER L. JUSTUS, *Examiner.*

R. E. BERGER, *Assistant Examiner.*